US012406522B2

(12) United States Patent
Yamada et al.

(10) Patent No.: US 12,406,522 B2
(45) Date of Patent: Sep. 2, 2025

(54) FILTERED IMAGES FOR 3D BODY TRACKING

(71) Applicant: International Business Machines Corporation, Armonk, NY (US)

(72) Inventors: Yasunori Yamada, Kawaguchi (JP); Kaoru Shinkawa, Hachioji (JP); Masatomo Kobayashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 17/643,822

(22) Filed: Dec. 10, 2021

(65) Prior Publication Data

US 2023/0186669 A1 Jun. 15, 2023

(51) Int. Cl.
*G06V 40/10* (2022.01)
*G06T 5/70* (2024.01)
*G06T 5/94* (2024.01)
*G06T 17/00* (2006.01)

(52) U.S. Cl.
CPC ............ *G06V 40/103* (2022.01); *G06T 5/70* (2024.01); *G06T 5/94* (2024.01); *G06T 17/00* (2013.01); *G06T 2207/10048* (2013.01); *G06T 2207/30196* (2013.01)

(58) Field of Classification Search
CPC ...... G06V 40/10; G06V 40/103; G06V 40/20; G06V 20/64; G06V 40/25; G06T 5/70; G06T 5/94; G06T 17/00; G06T 2207/10048; G06T 2207/30196
See application file for complete search history.

(56) References Cited

U.S. PATENT DOCUMENTS

| | | | | |
|---|---|---|---|---|
| 7,347,365 | B2* | 3/2008 | Rowe | B60R 25/255 235/382 |
| 7,822,272 | B2* | 10/2010 | Lei | G06T 5/40 382/199 |
| 8,553,972 | B2* | 10/2013 | Kim | G06T 7/50 348/43 |
| 9,215,984 | B2* | 12/2015 | Hattery | H04N 25/00 |
| 9,418,475 | B2* | 8/2016 | Medioni | G06T 17/00 |
| 9,889,528 | B2* | 2/2018 | Wang | G06T 7/13 |
| 10,178,366 | B2* | 1/2019 | Lucas | G06T 17/00 |
| 10,586,351 | B1* | 3/2020 | Brailovskiy | H04N 23/75 |

(Continued)

FOREIGN PATENT DOCUMENTS

| | | | | |
|---|---|---|---|---|
| CN | 112183316 A | * | 1/2021 | ............. G06N 3/045 |
| JP | 2017123966 A | * | 7/2017 | ............... A61B 5/08 |
| WO | WO-2013188825 A1 | * | 12/2013 | ............. G02C 7/104 |

OTHER PUBLICATIONS

D'Eusanio et al. "Refinet: 3d human pose refinement with depth maps." 2020 25th International Conference on Pattern Recognition (ICPR). IEEE, 2021. (Year: 2021).*

(Continued)

*Primary Examiner* — Van D Huynh
*Assistant Examiner* — Benedict E Lee
(74) *Attorney, Agent, or Firm* — Jared C. Chaney

(57) ABSTRACT

Aspects of the present disclosure relate to a system receiving an infrared (IR) image, receiving a depth map associated with the IR image, applying one or more filters to the IR image based on a set of parameters, generating a 2D pose for a subject based on the filtered IR image, and generating a 3D pose by correlating the 2D pose to the depth map.

20 Claims, 5 Drawing Sheets

(56) References Cited

U.S. PATENT DOCUMENTS

| | | | | |
|---|---|---|---|---|
| 10,755,418 | B2* | 8/2020 | Qiu | G06T 7/11 |
| 11,080,516 | B1* | 8/2021 | Joshi | G06V 40/19 |
| 11,188,770 | B2* | 11/2021 | Su | G06V 40/103 |
| 11,854,146 | B1* | 12/2023 | Smith | G06V 20/647 |
| 12,100,104 | B2* | 9/2024 | Sharma | G06T 15/06 |
| 2011/0026808 | A1* | 2/2011 | Kim | G06T 7/50 |
| | | | | 348/43 |
| 2011/0188773 | A1* | 8/2011 | Wei | G06T 5/70 |
| | | | | 382/260 |
| 2015/0178933 | A1* | 6/2015 | Han | G06T 5/70 |
| | | | | 382/154 |
| 2016/0127710 | A1* | 5/2016 | Saban | G11B 27/005 |
| | | | | 386/241 |
| 2016/0171295 | A1 | 6/2016 | Shotton | |
| 2017/0287213 | A1* | 10/2017 | Loper | G06T 13/40 |
| 2018/0174299 | A1* | 6/2018 | Agrawal | H04N 13/106 |
| 2018/0293788 | A1 | 10/2018 | Black | |
| 2018/0309940 | A1* | 10/2018 | Okada | H04N 23/84 |
| 2019/0058859 | A1* | 2/2019 | Price | H04N 13/271 |
| 2019/0114794 | A1* | 4/2019 | Wang | G06T 7/70 |
| 2019/0317597 | A1* | 10/2019 | Aleem | G06V 40/19 |
| 2021/0199479 | A1* | 7/2021 | Lau | G01S 13/931 |
| 2022/0383585 | A1* | 12/2022 | Lee | G06T 15/08 |
| 2023/0298204 | A1* | 9/2023 | Wang | G06T 7/73 |
| | | | | 345/419 |

OTHER PUBLICATIONS

Budzan et al. "Remarks on noise removal in infrared images." Measurement Automation Monitoring 61.6 (2015): 187-190. (Year: 2015).*

Moon et al. "Gait variability in people with neurological disorders: A systematic review and meta-analysis." Human movement science 47 (2016): 197-208. (Year: 2016).*

Pavlakos, Georgios, et al. "Expressive body capture: 3d hands, face, and body from a single image." Proceedings of the IEEE/CVF conference on computer vision and pattern recognition. 2019. (Year: 2019).*

D'Eusanio et al., "RefiNet: 3D Human Pose Refinement with Depth Maps," 25th International Conference on Pattern Recognition (ICPR) Jan. 10-15, 2021, pp. 2320-2327, Milan, Italy.

International Search Report and Written Opinion for Application PCT/EP2022/084114, Mar. 7, 2023, 9 pages.

"Azure Kinect DK," Azure.com, accessed Dec. 1, 2021, 8 pages. <https://azure.microsoft.com/en-us/services/kinect-dk/>.

Budzan et al., "Remarks on Noise Removal in Infrared Images," Measurement Automation Monitoring, vol. 61, No. 6, Jun. 2015, pp. 187-190.

Moon et al., "Gait variability in people with neurological disorders: A systematic review and meta-analysis," Human Movement Science, vol. 47, Jun. 2016, https://doi.org/10.1016/j.humov.2016.03.010, pp. 197-208.

Pieruccini-Faria et al., "Gait variability across neurodegenerative and cognitive disorders: Results from the Canadian Consortium of Neurodegeneration in Aging (CCNA) and the Gait and Brain Study," Alzheimer's & Dementia, Jan. 1, 2021, https://doi.org/10.1002/alz.12298, 12 pages.

"OpenPose," GitHub, accessed Dec. 10, 2021, 8 pages. <https://github.com/CMU-Perceptual-Computing-Lab/openpose>.

Chen et al. "Automatic detection of IR ship on the basis of variance statistic.", MCCA 2015, Jun. 5, 2015, 04 pages.

Moltedo, et al., Powered Ankle-Foot Orthoses: The Effects Of The Assistance On Healthy And Impaired Users While Walking, Journal of NeuroEngineering and Rehabilitation, Oct. 1, 2018, Article No. 86, 25 pages.

Quickstart: Set Up Azure Kinect Body Tracking, Retrieved from: Quickstart—Set up Azure Kinect body tracking | Microsoft Learn, Mar. 15, 2022, 4 pages.

* cited by examiner

FILTERED IMAGES FOR 3D BODY TRACKING

BACKGROUND

Aspects of the present disclosure relate to analyzing three-dimensional (3D) images, more particular aspects relate to filtered images for 3D body tracking.

A change in gait characteristics has been associated with changes in physical/cognitive/mental conditions and related diseases (e.g., Alzheimer's disease, Parkinson disease, frailty, depression), and the use of gait analysis may be used as screening/monitoring tools for these conditions.

BRIEF SUMMARY

The present disclosure provides a method, computer program product, and system of identifying friction points in customer data. In some embodiments, the method includes receiving an infrared (IR) image, receiving a depth map associated with the IR image, applying one or more filters to the IR image based on a set of parameters, generating a 2D pose for a subject based on the filtered IR image, and generating a 3D pose by correlating the 2D pose to the depth map.

In some embodiments, the computer program product comprising a computer readable storage medium having program instructions embodied therewith, the program instructions executable by a processor to cause the processors to perform a method, the method comprising receiving an infrared (IR) image, receiving a depth map associated with the IR image, applying one or more filters to the IR image based on a set of parameters, generating a 2D pose for a subject based on the filtered IR image, and generating a 3D pose by correlating the 2D pose to the depth map.

In some embodiments, the system includes a processor, and a memory in communication with the processor, the memory containing program instructions that, when executed by the processor, are configured to cause the processor to perform a method, the method comprising receiving an infrared (IR) image, receiving a depth map associated with the IR image, applying one or more filters to the IR image based on a set of parameters, generating a 2D pose for a subject based on the filtered IR image, and generating a 3D pose by correlating the 2D pose to the depth map.

DETAILED DESCRIPTION

Figure 1:
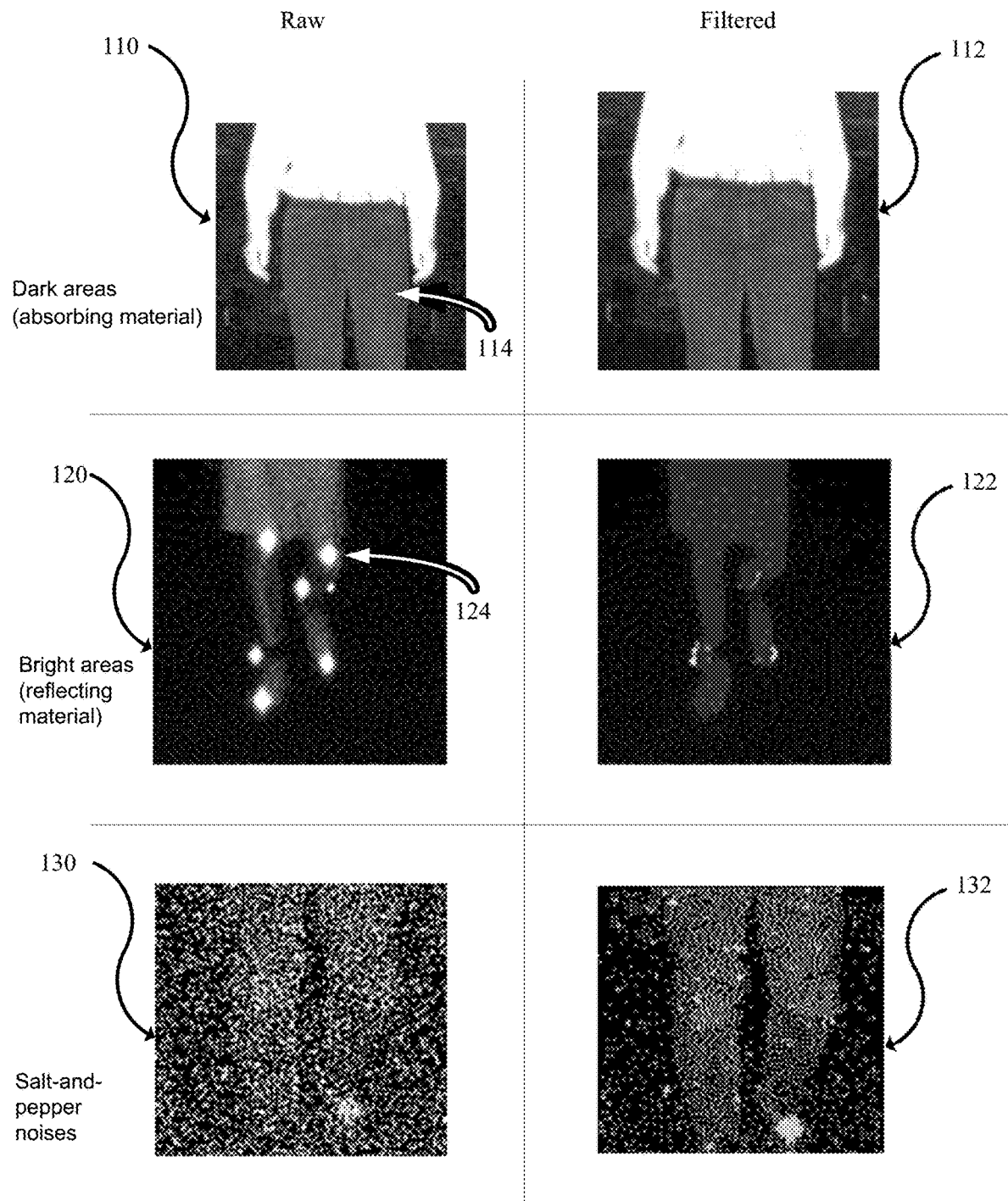
FIG. 1 depicts experimental infrared (IR) images that have been filtered to mitigate certain factors that may cause errors according to various embodiments of the present disclosure.

Aspects of the present disclosure relate to analyzing three-dimensional (3D) images, more particular aspects relate to filtered images for 3D body tracking.

Gait analysis is the systematic study of animal locomotion, more specifically the study of human motion, using the eye and the brain of observers, augmented by instrumentation for measuring body movements, body mechanics, and the activity of muscles. Gait analysis is used to assess and treat individuals with conditions affecting their ability to walk. It is also commonly used in sport biomechanics to help athletes run more efficiently and to identify posture-related or movement-related problems in people with injuries. It can be beneficial in that it can identify overactive or underactive muscles throughout the body, which could lead to potential injuries and inefficiencies or identification of underlying ailments in the future.

Gait analysis often makes use of infrared (IR) images. An IR image may be an IR video, a frame in an IR video, or an IR photograph. In some embodiments, IR images may be used to measure surface temperatures by using infrared video and still cameras. IR imaging creates two-dimensional (2D) images using the IR or heat spectrum. Images on the video or film record the temperature variations of a surface, ranging from white (for warm regions) to black (for cooler areas). Thermal imaging is a very powerful remote sensing technique for a number of reasons, particularly when used for gait analysis. In some embodiments, the IR imaging data may be collected at the speed of light in real time from a wide variety of platforms, including land, water, and air-based vehicles. It is superior to visible imaging technologies because IR radiation can penetrate smoke, aerosols, dust, and mists more effectively than visible radiation so that subjects may be detected over a wide range of normally troublesome atmospheric conditions. Further, it is a passive technique capable of imaging under both daytime and nighttime conditions. This minimizes disruptions and stressful disturbances to subjects as they are walking. For example, in some instances IR images may be gathered without the subjects noticing.

Although useful, IR images may have issues that need to be overcome. For example, clothing, especially clothes made of IR absorbing or reflecting material, may cause failure in body tracking. Likewise, body tracking failure may also result from the existence of relatively dark or bright areas inside the person's silhouette in IR images, from sources such as absorbing/reflecting materials, outside light sources, the IR sensor, background clutter, the atmosphere, or shadows. In some instances, dark and/or bright areas make atypical local brightness contrast areas that interfere with image-based body tracking. In some instances, IR images are used to create depth graphs. However, the distance they can measure is limited and they suffer from reflection problems on transparent, shiny, or very matte and absorbing objects. If more than one IR camera is used, the IR patterns may interfere with each other. This results in a massive loss of depth information. In some embodiments, image filtering methods alleviate these problems. For example, smoothing filters may be used to reduce salt-and-pepper noises that affect gait analysis. Likewise, estimate filtering may help reduce the effect of dark/bright areas.

FIG. 1 depicts experimental IR images that have been filtered to mitigate certain factors that may cause errors. In the first example, raw image 110 is an IR image with dark areas 114 (e.g., absorbing material) before filtering and filtered image 112 is the IR image after filtering. For example, pants from raw image 110 are obscured by dark areas 114, but after filtering these pants (and therein the limbs within the pants) are visible in filtered image 112. In the second example, raw image 120 is an IR image with bright areas 124 (e.g., reflecting material) before filtering and filtered image 122 is the IR image after filtering. In the third example, raw image 130 is an IR image with salt-and-pepper noise before filtering and filtered image 132 is the IR image after filtering. The filters and settings used for the filtered images in FIG. 1 are as follows: Median filter (kernel size=7)–Gaussian filter (sigma=1). For each image, both filters were applied in sequence. The size of original images was 512×512.

Figure 2:
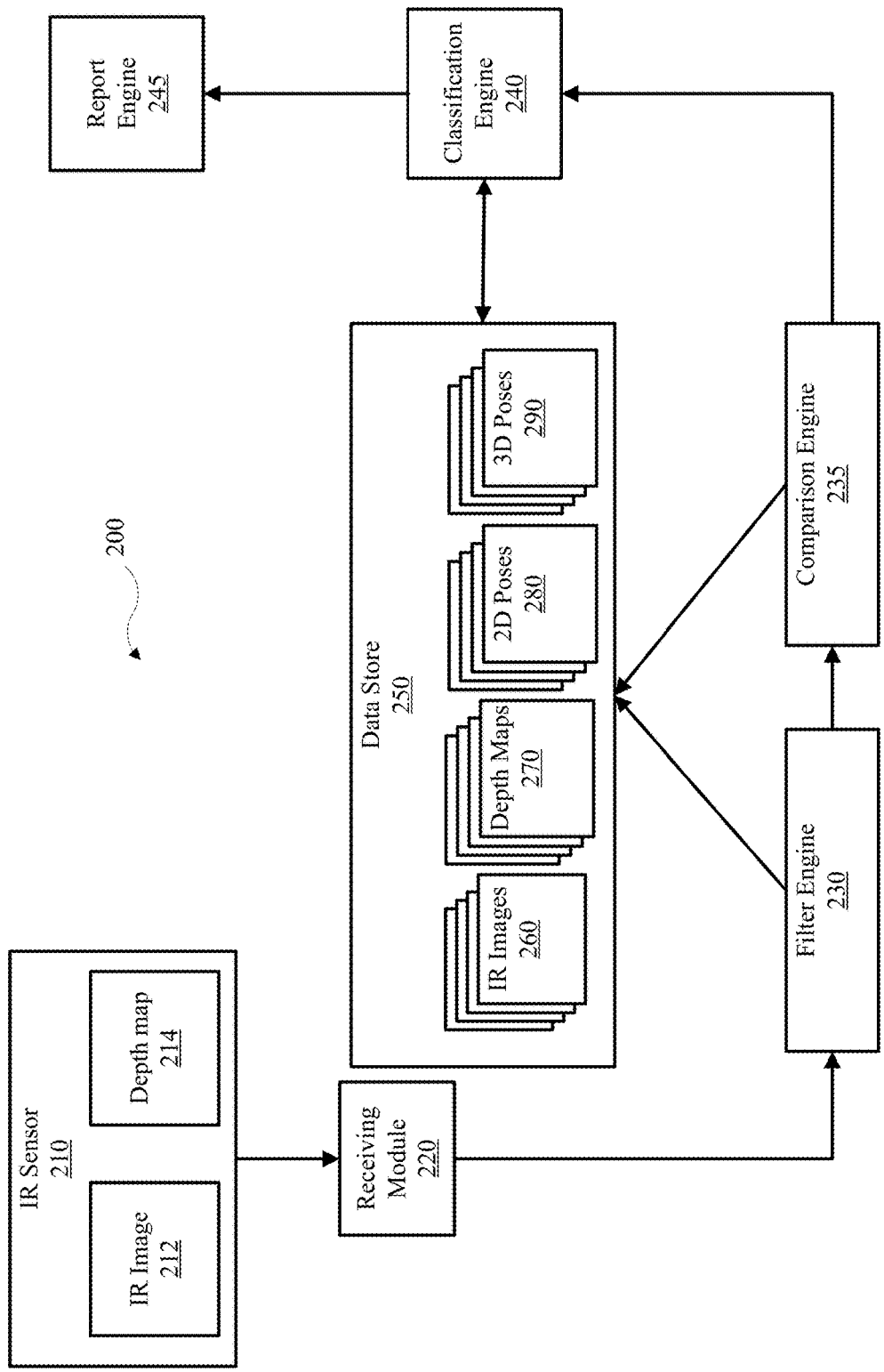
FIG. 2 is an example block diagram illustrating components of an IR image filtering system according to various embodiments of the present disclosure.

FIG. 2 is a block diagram illustrating components of an IR image filtering system 200 according to one illustrative embodiment. The IR image filtering system 200 includes an IR sensor 210 (e.g., an IR camera) to record an IR image 212 and a depth map 214, a receiving module 220, a filter engine 230, a comparison engine 235, a classification engine 240, a data store 250 (with multiple IR Images 260, Depth Maps 270, 2D Poses 280, and 3D Poses 290), and a reporting engine 245. In some embodiments, data annotation system 200 may run on Computing system 801 of FIG. 5.

In some embodiments, the receiving module 220 may receive IR image 212 and a depth map 214. In some embodiments, IR Images 260, Depth Maps 270, 2D Poses 280, and 3D Poses 290 are collections of historical data collected for a user or a group of subjects over a set time period and may be linked to IR image 212 and the depth map 214 for the same subject or group of subjects over the same time period. For example, the data may be collected for a subject while the subject is in a field of view for an IR sensor.

In some embodiments, multiple IR Images 260, Depth Maps 270, 2D Poses 280, and 3D Poses 290 are historical files. For example, multiple IR Images 260, Depth Maps 270, 2D Poses 280, and 3D Poses 290 may have previously been created for specific subjects. In some embodiments, multiple IR Images 260, Depth Maps 270, 2D Poses 280, and 3D Poses 290 are collected across multiple stages of a walk.

In some embodiments, filter engine 230 applies filters to the IR image 212. In some embodiments, filter engine 230 is used to generate a 2D pose for the IR image. For example, filter engine 230 may first apply one or more filters (described in block 320 below) to an IR image. Then, system 200 may project the filtered image to a rigid articulated model. Each 2D model may be fit to a corresponding silhouette contour using methods such as iterated closest points. The 2D fit may be used to impose a human frame (see FIG. 4B) forming the 2D pose. For generating a 2D pose for an IR image, the system may make use of conventional deep learning (DL)-based pose estimation models such as OpenPose. In some instances, for DL models, the input data is a 2D camera image and the output data is a 2D pose.

In some embodiments, the generated 2D pose may be augmented with data from depth map 270 to form a 3D pose or 3D model for the subject. Described in detail in FIG. 3 block 330 below, in some embodiments, the 2D pose is augmented with depths for each point of articulation on the 2D frame to generate the 3D pose.

Comparison engine 235 compares standard or accepted information to the filtered images to determine a performance of the filter parameters. For example, in some embodiments, a set of standard images, were the performance has been determined may be compared to the filtered set of images to determine how accurate they are. For example, some resolution parameters may derived from the filtered images and compared acceptable resolution information. In some embodiments, the comparison is used to create correlation coefficients (e.g., a performance) between the 3D pose and one or more standards for each parameter set used for the one or more filters. For example, the standards may be one or more models the poses are set against, or one or more 3D poses for frames before or after the frame being processed (e.g., 3D poses 290). In some embodiments, the evaluation of pose estimation performance can be done either before or after generating a 3D pose. If the evaluation is done before generating a 3D pose, comparison engine 235 evaluates the performance of 2D pose estimation. In some embodiments, performance may be the success rate of pose estimation. For example, the performance is 50% when pose estimation succeeded for 50 of 100 frames. The "pose estimation success" can be defined by criteria such as "confidence score output from the DL-based model is greater than 0.5".

The most straightforward definition of the performance may be the success rate of pose estimation. For example, the performance is 50% when pose estimation succeeded for 50 of 100 frames. The "pose estimation success" can be defined by criteria such as "confidence score output from the DL-based model is greater than 0.5".

In some embodiments, report engine 245 generates a report detailing performance generated by the comparison engine 235. In some embodiments, the report engine 245 graphically displays the models and one or more points of the models with a low correlation coefficient. For example, for a particular model with particular filter settings, the pelvis may have a high performance (correlation coefficient of more than 90%) while the arms have a low performance (correlation coefficient of less than 50%). In some embodiments, metrics for the 3D pose estimation performance may include the maximum/minimum distance between the subject and the camera where succeeded in pose estimation tracking (or detection of the target joint) or the success rate of pose estimation (or detection of the target joint) is measured in % of frames.

In some embodiments, report engine 245 may transmit the 3D pose to a gait analysis system (not depicted) for gait analysis.

Figure 3:
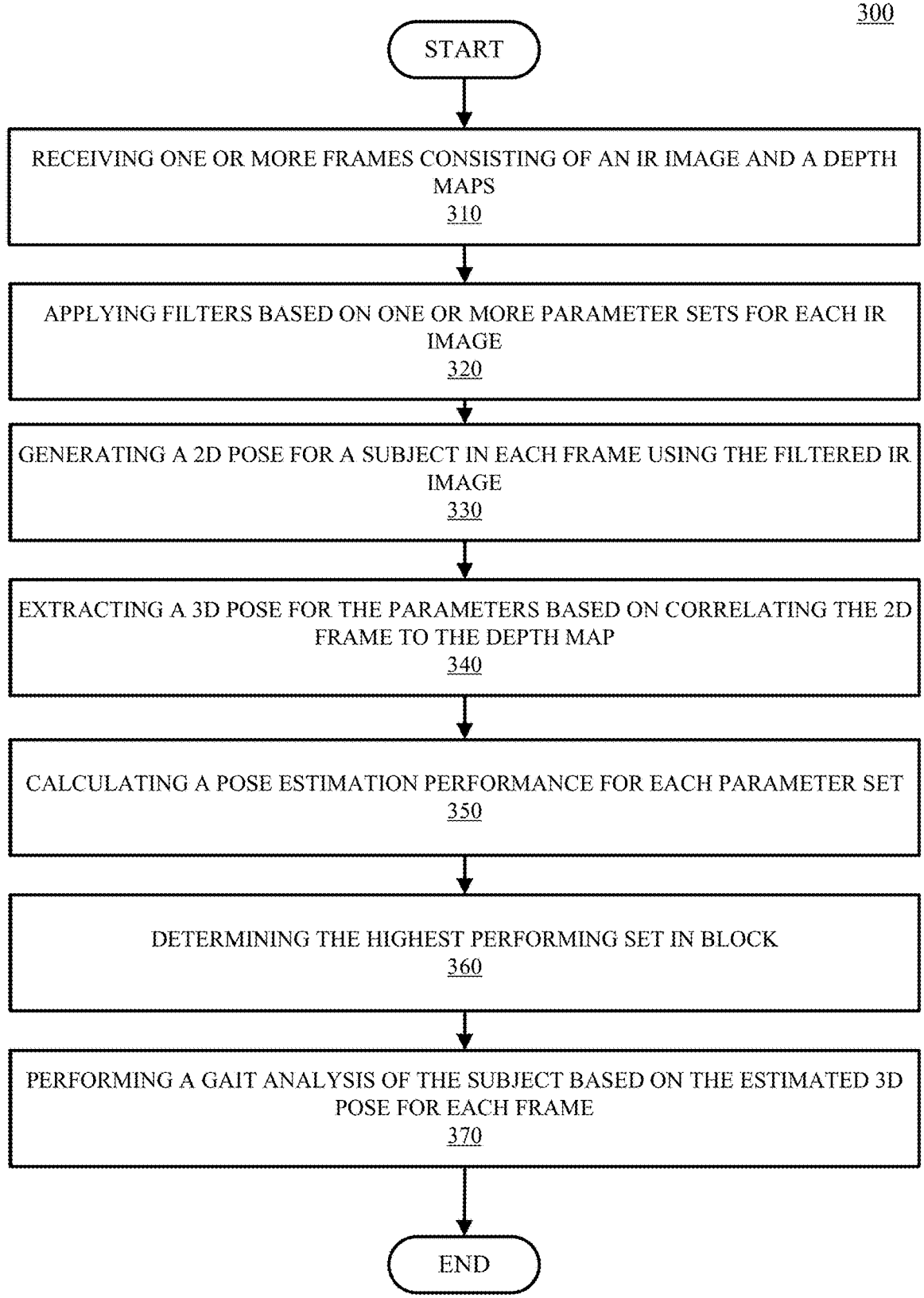
FIG. 3 illustrates an example method for improving 3D pose tracking according to various embodiments of the present disclosure.

FIG. 3 shows an example method 300 for improving 3D pose tracking. The example method 300 estimates a 3D pose for a frame (e.g., either a frame from an IR video or an IR image).

In block 310, a system receives one or more frames consisting of an IR image and a depth maps.

Figure 4A:
FIG. 4A illustrates an example IR image, in accordance with embodiments of the present disclosure.
Figure 4B:
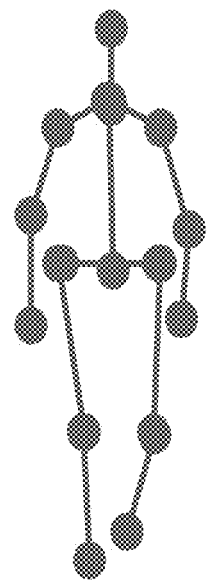
FIG. 4B illustrates an example two-dimensional (2D) pose, in accordance with embodiments of the present disclosure.
Figure 4C:
FIG. 4C illustrates an example depth map, in accordance with embodiments of the present disclosure.

A depth map is an image or image channel that contains information relating to the distance of the surfaces or objects of scene from a viewpoint. The term is related to and may be analogous to depth buffer, Z-buffer, Z-buffering and Z-depth. In some embodiments, a depth image is computed by calculating the distortion of a known infrared light (IR) pattern which is projected into the scene. FIG. 4A depicts an example IR image and FIG. 4C depicts an example depth map.

Referring back to FIG. 3, in block 320, the system applies filters based on one or more parameter sets for each IR image. In some embodiments, filtering replaces a pixel value in an image with the mean ('average') value determined by the filter's characteristics (for example, the average of the neighboring pixels, including the pixel itself). This has the effect of eliminating pixel values which are unrepresentative of their surroundings. For example, a mean filter is based around a kernel, which represents the shape and size of the neighborhood to be sampled when calculating the mean. In the proposed method for addressing bright/dark areas (e.g., salt and pepper noises), larger kernels (e.g., 7×7) may be used. But relatively better (e.g., more desired by a user) parameters will depend on the image size and content, and will be identified through an iterative process depicted in.

In some instances, the effect of Gaussian smoothing is to blur an image, in a similar fashion to the mean filter. The degree of smoothing is determined by the standard deviation of the Gaussian.

In some embodiments, Gaussian outputs a 'weighted average' of the general area of a pixel, with the average weighted more towards the value of the central pixels. This is in contrast to the mean filter's uniformly weighted average. Because of this, a Gaussian provides gentler smoothing and preserves edges better than a similarly sized mean filter.

In some embodiments, the system selects one or more parameters for filtering. In some embodiments, the parameters may be based on the presence of dark areas, bright areas, or noise in the IR images. As described below, the system may select parameters such that the pose estimation performance is increased and/or maximized. In some embodiments, the parameters may be kernel size or Gaussian. In some embodiments, the kernel size refers to the width×height of the filter mask. The max pooling layer, for example, returns the pixel with the maximum value from a set of pixels within a mask (kernel). That kernel is swept across the input, subsampling it. In some embodiments, a Gaussian smoothing operator is a 2-D convolution operator that is used to 'blur' images and remove detail and noise. In this sense it is similar to the mean filter, but it uses a different kernel that represents the shape of a Gaussian ('bell-shaped') hump. In some embodiments, a convolution is performed by sliding the kernel over the image, generally starting at the top left corner, so as to move the kernel through all the positions where the kernel fits entirely within the boundaries of the image. In some instances, each kernel position corresponds to a single output pixel, the value of which is calculated by multiplying together the kernel value and the underlying image pixel value for each of the cells in the kernel, and then adding all these numbers together.

In some embodiments, Gaussian smoothing uses a 2D distribution as a spread function. An image is a collection of discrete pixels, thus a discrete approximation to the Gaussian function is needed before the spread function is performed. In theory, the Gaussian distribution is non-zero everywhere, which would require an infinitely large spread function kernel, but in practice it is effectively zero more than about three standard deviations from the mean, and thus the kernel may be truncated at this point. In some embodiments, it is not obvious how to pick the values of the mask to approximate a Gaussian. In some instances, the value of the Gaussian varies non-linearly across the pixel. In some embodiments, the value of the Gaussian may be integrated over the whole pixel (for example, by summing the Gaussian at 0.001 increments). If the integrals are not integers, the array may be rescaled.

In some embodiments, once a suitable kernel has been calculated for the Gaussian smoothing, then the Gaussian smoothing can be performed using standard convolution methods.

In some embodiments, other types of smoothing such as median filtering or conservative smoothing may be used.

In block 330, the system generates a 2D pose for a subject in each frame using the filtered IR image. FIG. 4B depicts a 2D image derived from the IR image shown in FIG. 4A. In some embodiments, a deep learning (DL)-based pose estimation model may be used to generate a 2D pose.

In block 340, the system extracts a 3D pose for the parameters based on correlating the 2D frame to the depth map. In some embodiments, by applying the depth for each body part, from the depth map to the 2D model, a 3D pose for the subject may be derived.

In some embodiments, each frame has an IR image and a separate auxiliary depth map. The depth map indicates depths of the body parts of the subject present in the frame. The depth map is a separate grayscale image having the same dimensions as the original 2D image (see FIG. 3C for an example), with various shades of gray to indicate the depth of parts of the subject's body in the frame.

In some embodiments, the depth map may be used in conjunction with the 2D model to perform depth-based conversion. Some elements of depth-based conversion may segment the subject's body into individual points or create mattes to isolate elements. In some embodiments, each important area of the body may be isolated. For example, body joints, particularly the pelvis, are important for gait analysis. In some embodiments, the level of detail depends on the required conversion quality.

In block 350, the system calculates a pose estimation performance for each parameter set. In some embodiments, the pose estimation performance may be performed for several parameter sets. In some embodiments, performance may be determined by comparing the pose or a series of poses to a standard model to determine how closely the pose or series matches the standard model. In some embodiments, the performance may be determined by discrepancies that appear between frames. For example, if a first frame has the pelvis in one position and in the next frame it jumps to another position the performance may be low. This could be measured by degree of differentiation (e.g., low is a 10% correlation while high may be a 90% correlation.)

In some embodiments, the pose estimation performance of the set of parameters is calculated based on an accurate detection of one or more target joints of the subject or a number of joints accurately detected for the subject. For example, the pelvis is a critical joint and successful detection of the pelvis may increase the performance score. Likewise, if only one joint is detected accurately (even with a high accuracy), the pose estimation performance may be low due to the low number of joints accurately detected. In some embodiments, accurate detection may be measured as a detection accuracy measurement. For example, the detection accuracy could be a physical measurement (e.g., distance between an accepted point and a measured point or degree of difference between two points), a percentage of variability, or another measurement to the degree of accuracy. In some embodiments, accuracy detection and may be based on an accuracy threshold, where an accuracy measurement above a threshold number may be accurate.

In some embodiments, blocks 320-350 may be repeated for a selection of parameter sets to determine the highest performing set of parameters in block 360. In some embodiment, block 360 may include selecting, based on the comparing, a set of parameters from the set of parameters and the one or more other sets of parameters that satisfies a performance threshold. In some embodiments, a performance threshold is a value determined for a set of parameters. A value of performance at or beyond a threshold may be considered accurate. A value below the threshold may be considered not accurate. For example, application of a set of parameters with a measured performance above the performance threshold may be considered an acceptable filter application.

In block 370, the system performs a gait analysis of the subject based on the estimated 3D pose for each frame. In some embodiments, using the parameter set with the highest performance, the blocks 320-340 may be repeated for each frame and then put through gait analysis. In some embodiments, different parameters may be used for different sets of frames. For example, ambient lighting changes may change as the subject walks, thus different filters and different parameters may be used for discrete groups of frames to account for changes in the ambient light.

FIG. 4A is an example IR image, FIG. 4B is an example 2D pose (e.g., 2D frame) created from the IR image depicted in FIG. 4A, and FIG. 4C is a depth map for the same frame as FIG. 4A.

Figure 5:
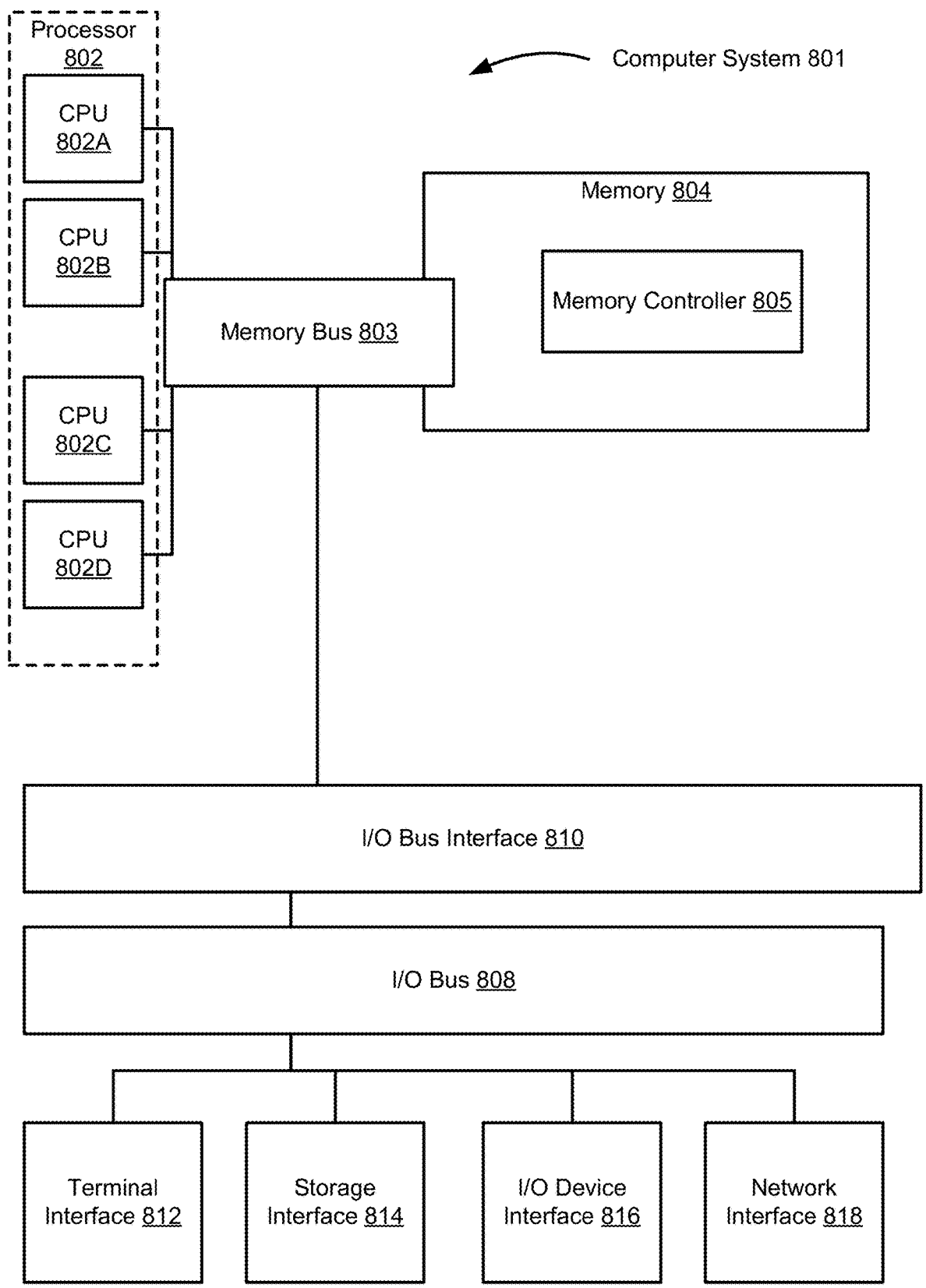
FIG. 5 illustrates a high-level block diagram of an example computer system that may be used in implementing embodiments of the present disclosure.

Referring now to FIG. 5, shown is a high-level block diagram of an example computer system 801 that may be configured to perform various aspects of the present disclosure, including, for example, method 300. The example computer system 801 may be used in implementing one or more of the methods or modules, and any related functions or operations, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 805.

Although the memory bus 803 is shown in FIG. 5 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 801. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a processor; and
   a memory in communication with the processor, the memory containing program instructions that, when executed by the processor, are configured to cause the processor to perform a method, the method comprising:
      receiving an infrared (IR) image;
      receiving a depth map associated with the IR image;
      applying one or more filters to the IR image based on a set of parameters, wherein the one or more filters are configured to reduce local brightness contrast from absorbance and reflectance properties of materials on a subject;
      generating a 2D pose for the subject based on the filtered IR image; and
      generating a 3D pose by correlating the 2D pose to the depth map.

2. The system of claim 1, further comprising:
   determining a performance of the set of parameters based on an accuracy of the 3D pose;

comparing the performance of the set of parameters to a performance of one or more other sets of parameters; and selecting, based on the comparing, a set of parameters from the set of parameters and the one or more other sets of parameters that satisfies a performance threshold.

3. The system of claim 2, wherein the performance of the set of parameters is calculated based on a detection accuracy of a target joint of the subject.

4. The system of claim 2, wherein the performance of the set of parameters is calculated based on a number of joints with an accuracy detection above a threshold for the subject.

5. The system of claim 1, wherein the one or more filters comprise a smoothing filter.

6. The system of claim 5, wherein the smoothing filter reduces a local brightness contrast inside a silhouette of the IR image.

7. The system of claim 1, wherein one or more parameters of the one or more filters are selected to reduce local brightness contrast induced by clothing that interferes with IR images.

8. A computer program product comprising a computer readable storage medium having program instructions embodied therewith, the program instructions executable by a processor to cause the processors to perform a method, the method comprising:
receiving an infrared (IR) image;
receiving a depth map associated with the IR image;
applying one or more filters to the IR image based on a set of parameters, wherein the one or more filters are configured to reduce local brightness contrast from absorbance and reflectance properties of materials on a subject;
generating a 2D pose for the subject based on the filtered IR image; and
generating a 3D pose by correlating the 2D pose to the depth map.

9. The computer program product of claim 8, further comprising:
determining a performance of the set of parameters based on an accuracy of the 3D pose;
comparing the performance of the set of parameters to a performance of one or more other sets of parameters; and
selecting, based on the comparing, a set of parameters from the set of parameters and the one or more other sets of parameters that satisfies a performance threshold.

10. The computer program product of claim 9, wherein the performance of the set of parameters is calculated based on a detection accuracy of a target joint of the subject.

11. The computer program product of claim 9, wherein the performance of the set of parameters is calculated based on a number of joints with an accuracy detection above a threshold for the subject.

12. The computer program product of claim 8, wherein the one or more filters comprise a smoothing filter.

13. The computer program product of claim 12, wherein the smoothing filter reduces a local brightness contrast inside a silhouette of the IR image.

14. The computer program product of claim 8, wherein one or more parameters of the one or more filters are selected to reduce local brightness contrast induced by clothing that interferes with IR images.

15. A method comprising:
receiving an infrared (IR) image;
receiving a depth map associated with the IR image;
applying one or more filters to the IR image based on a set of parameters, wherein the one or more filters are configured to reduce local brightness contrast from absorbance and reflectance properties of materials on a subject;
generating a 2D pose for the subject based on the filtered IR image; and
generating a 3D pose by correlating the 2D pose to the depth map.

16. The method of claim 15, further comprising:
determining a performance of the set of parameters based on an accuracy of the 3D pose;
comparing the performance of the set of parameters to a performance of one or more other sets of parameters; and
selecting, based on the comparing, a set of parameters from the set of parameters and the one or more other sets of parameters that satisfies a performance threshold.

17. The method of claim 16, wherein the performance of the set of parameters is calculated based on a detection accuracy of a target joint of the subject.

18. The method of claim 16, wherein the performance of the set of parameters is calculated based on a number of joints with an accuracy detection above a threshold for the subject.

19. The method of claim 15, wherein the one or more filters comprise a smoothing filter.

20. The method of claim 19, wherein the smoothing filter reduces a local brightness contrast inside a silhouette of the IR image.

* * * * *